UNITED STATES PATENT OFFICE.

DOUGLAS FRANK TWISS, OF SUTTON COLDFIELD, ENGLAND, ASSIGNOR TO THE DUNLOP RUBBER COMPANY, LIMITED, OF WESTMINSTER, LONDON, ENGLAND.

VULCANIZATION OF RUBBER AND SIMILAR MATERIALS.

1,271,810.            Specification of Letters Patent.      Patented July 9, 1918.

No Drawing.        Application filed January 4, 1918. Serial No. 210,302.

*To all whom it may concern:*

Be it known that I, DOUGLAS FRANK TWISS, a subject of the King of Great Britain, residing at Royal Road, Sutton Coldfield, in the county of Warwick, England, have invented certain new and useful Improvements in or Relating to the Vulcanization of Rubber and Similar Materials, of which the following is a specification.

This invention relates to the vulcanization of rubber and similar vulcanizable materials and more specifically to the acceleration of the vulcanizing action by the employment of a strongly basic substance.

Vulcanization accelerators of organic nature have been proposed and used for several years and with some few exceptions these accelerators are strongly basic substances, and the more effective mineral accelerators such as litharge, magnesia and lime are also basic compounds.

It has also recently been found that a crape rubber which, when freshly coagulated, has been soaked with a solution of caustic soda, vulcanizes rapidly but the suggestion that such a treatment of rubber might prove of practical value was withdrawn owing to the danger of causing deterioration of the rubber. Caustic alkali (sodium or potassium hydroxid) can, however, be satisfactorily employed as an accelerator if used in conjunction with other substances and in accordance with this invention an accelerator is employed consisting of a solution of caustic alkali in an organic compound, such as glycerol or glycol, which can without decomposition absorb or dissolve the alkali and so produce a uniform homogeneous mass. Glycerol or glycol are polyhydric alcohols and are examples of hydroxy-organic compounds which are found to be specially suitable for the present purpose. By adding the alkali to the rubber mixing in the manner described, the uniform distribution of the alkali throughout the mass can be insured, and the rate of vulcanization of the mixing is greatly accelerated.

If glycerol is heated to about 175° C. to expel superfluous water the hydroxid can be dissolved and on cooling a viscous solution of alkali glyceroxid is obtained. Potassium hydroxid is found usually to be somewhat preferable for this method. One part of potassium hydroxid may be used with three to four parts by weight of glycerol although the proportions may be varied much more widely. One or two per cent. of such a solution will mix into rubber uniformly and, as the solution has a low vapor pressure, there is no tendency to produce porosity of the rubber as may occur with many organic accelerators. It is found that a mixture of rubber with 5 per cent. of sulfur and 1 to 2 per cent. of the solution, when cured for 90 minutes at 40 lbs. pressure, undergoes complete vulcanization, practically no sulfur remaining uncombined.

Other organic compounds than glycerol may be employed for the solution of the alkali, such for example as glycol, as already mentioned.

What I claim and desire to secure by Letters Patent of the United States is:—

1. A method of accelerating a vulcanizing process which consists in adding to the rubber mixing an accelerator comprising caustic alkali dissolved in a hydroxy-organic compound forming a solvent which is not decomposed by the alkali.

2. A method of accelerating a vulcanizing process which consists of adding to the rubber mixture an accelerator comprising caustic alkali dissolved in a polyhydric alcohol.

3. A method of accelerating a vulcanizing process which consists in adding to the rubber mixing an accelerator comprising caustic alkali dissolved in glycerol or glycol.

DOUGLAS FRANK TWISS.